S. M. HEULINGS.
PROCESS OF PASTEURIZING MILK OR OTHER FLUIDS.
APPLICATION FILED DEC. 30, 1913.
1,150,269. Patented Aug. 17, 1915.
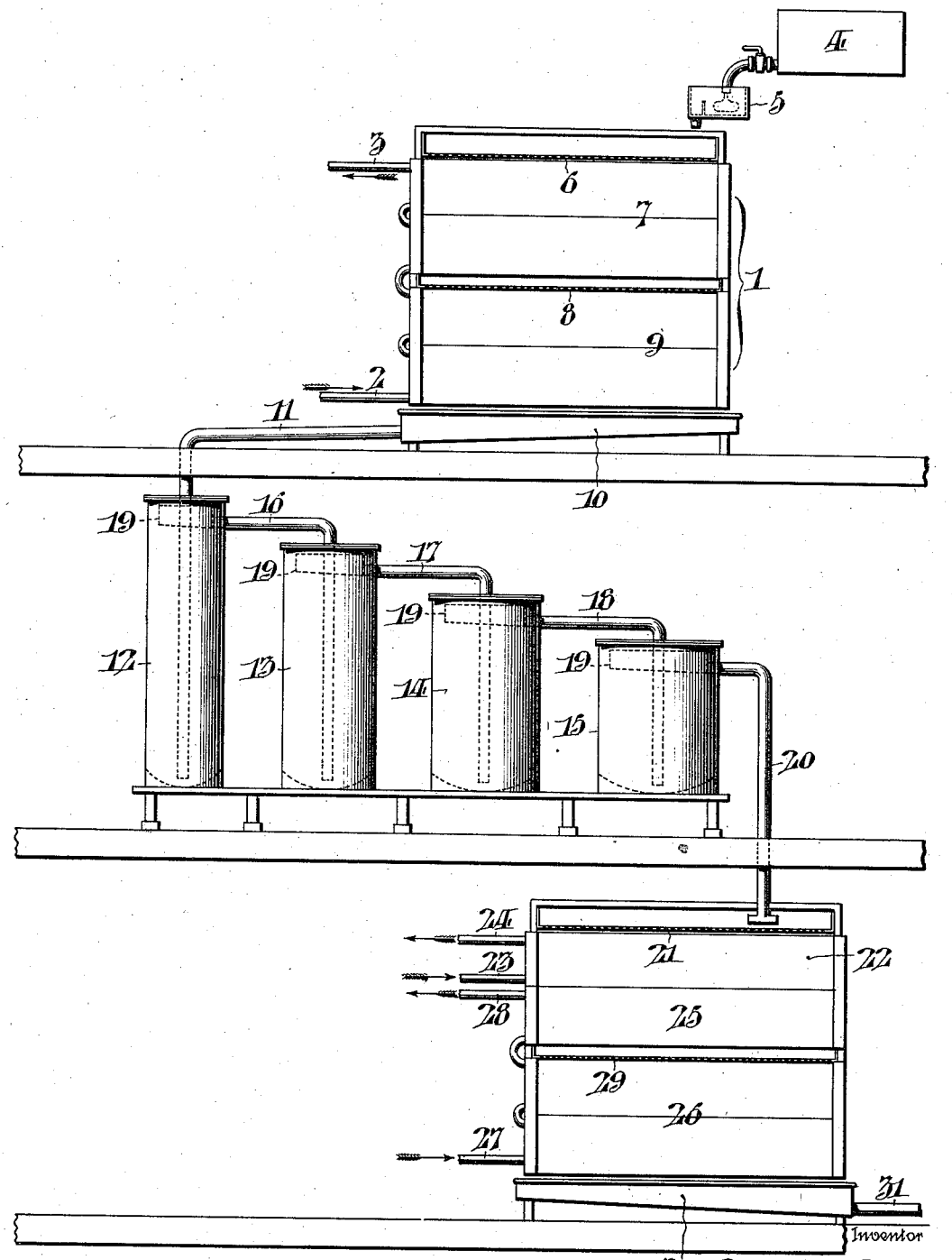

UNITED STATES PATENT OFFICE.

SAMUEL M. HEULINGS, OF HADDONFIELD, NEW JERSEY.

PROCESS OF PASTEURIZING MILK OR OTHER FLUIDS.

1,150,269. Specification of Letters Patent. Patented Aug. 17, 1915.

Application filed December 30, 1913. Serial No. 809,444.

*To all whom it may concern:*

Be it known that I, SAMUEL M. HEULINGS, of Haddonfield, in the county of Camden and State of New Jersey, have invented a certain new and useful Process of Pasteurizing Milk or other Fluids, whereof the following is a specification, reference being had to the accompanying drawing.

The present invention relates to a process of pasteurizing milk or other fluids, and the primary object is to eliminate the bacteria content to a greater degree than is possible by the methods and processes now employed, of which I am aware, and without materially changing the chemical condition of the milk.

My improved process of pasteurizing milk consists, generally, in heating the milk to a temperature ranging from one hundred and forty degrees to one hundred and fifty degrees F. and maintaining the milk at approximately this temperature for a period of time as from fifteen minutes to one hour or longer. This step in the process is substantially like the well known commercially designated proper or perfect pasteurization of the milk. At the expiration of such time period, the temperature of the milk is increased from five to fifteen degrees F., after which the milk is cooled to approximately fifty-five degrees F. or below.

My improved process of treating milk may be carried out by various means, but I prefer the apparatus shown more or less diagrammatically in the accompanying drawing. A description of the apparatus and the different steps in the treatment of the milk will make clear my improved process.

The primary heater 1, is provided which is supplied with a heating medium through a pipe 2, which heating medium is carried off through another pipe 3. The milk is placed in a tank or container 4, and is delivered therefrom to a controlling device 5, which supplies a perforated trough 6. This trough 6, delivers the milk over the upper portions or sections 7, of the primary heater from which it is collected in a second trough 8, and said trough 8, again distributes it over the second section 9, of the primary heater. The heating medium is supplied to the primary heater 1, at such temperature as may be required in relation to the volume of flow of the heating medium, the flow of the milk and the contiguous surfaces of contact between these two flows to raise the temperature of the milk to any point as hereinbefore described for the pasteurization of the commercially designated proper or perfect pasteurized milk. It is, however, preferable to utilize a heater with sufficient contiguous surface between the milk and heating medium so that the heating medium need not be raised in temperature more than one or two degrees above that temperature to which it is desired to raise the milk and in this manner an overheating of the milk would be impossible if for any reason the volume of the flow of the milk should be decreased or interrupted. The milk is thus raised to the desired temperature and is collected by the trough 10, from which it is delivered into the first unit 12, of a series of holding tanks or containers by means of a pipe 11, leading from the said trough 10, to a point contiguous to the bottom of said container 12. The remaining containers of the series designated respectively 13, 14 and 15, are successively of less height, and leading from each to the next adjacent are pipes designated respectively 16, 17 and 18. These pipes have their upper ends each connected to a device conveniently termed a collector or equalizer 19, in the top of one container and extend to the bottom of the next container. These containers are preferably provided with suitable insulation against the radiation of heat, so that the milk will be maintained at the aforesaid temperature in a relatively large body, and without agitation from the inflowing milk in the various containers rising slowly from the bottom of one to the top thereof, and then passing to the bottom of the next. With this arrangement it will, therefore, require such time period for the milk to pass through either one container or the series as the relations of the cubical contents of this container or series of containers bears to the amount of milk to be handled in the time period for which the milk is to be held. The time period for which the milk is preferably held, should be of such duration as hereinbefore described, for the commercially designated proper or perfect pasteurization of milk. The milk then leaves the last container 15, through a pipe 20, and is delivered into a trough 12, which distributes it over a superheater 22. A heating medium is supplied to this superheater by a suitable pipe 23, and is at such temperature relative to the temperature of the milk when discharged from the heating tank, and the amount of contiguous surfaces between this heating medium and the milk, as will raise the milk to a temperature of from five to fifteen degrees higher than the temperature at which it is discharged from the primary heater. It is preferable to use a superheater in which there is a sufficient surface, so that the heating medium need not be more than one degree higher than the maximum temperature to which it is desired to superheat the milk. Owing to this fact, the milk will not be heated by the superheater to a point higher than desired, even in the event of a fluctuation in the flow of milk from any cause, or, if it should be heated to a point higher than desired, the amount of this extra heating would be negligible.

In view of the fact that the milk is continuously traveling over the pipes 24, and 23, as shown in the drawings, the time period at which the milk is being raised to the higher point during the super-heating of the same is comparatively short.

Passing from the superheater 22, the milk is delivered upon a refrigerator or cooler comprising sections 25, and 26, supplied with a cooling medium from any suitable source through the pipe 27, an exhaust pipe 28, being employed for removing the cooling medium. After the milk passes over the first section 25, of the cooling or refrigerating compartment, it is delivered into a trough 29, which redistributes it upon the lower sections 26, and from said section 26, the milk is collected in the trough 30, to which is attached a delivery pipe 31, leading to any suitable receiver.

As is well known, raw milk has a larger or smaller bacteria content, varying greatly with its initial condition and the methods employed in its production and handling, and this bacteria content comprises germs of greater and less heat-resisting species. With the present process, those germs which are most susceptible to the action of heat, are destroyed by the initial heating of the milk, and certain of those germs having greater heat-resisting qualities, are destroyed during the time in which the milk is held at this pasteurizing temperature, as above described for the production of the commercially proper and perfectly pasteurized milk. Those germs, however, which survive both the initial heating and the holding period, are, of course, the greatest heat resisters, but they have been more or less weakened by their long exposure to the pasteurizing temperature. Consequently, as soon as the temperature is increased, many more succumb or are destroyed, and experience has demonstrated that among the content which remains, the quick cooling after the sudden increase, effects the destruction of a further quantity, thereby leaving a product that is nearer the desired germ free milk.

While I have described an apparatus for carrying out my process in which the milk is treated continuously, it will be understood that various other types of apparatus may be used and that the milk may be treated in the well-known batch method, if desired. It will also be understood that my pasteurizing process may be used for treating other liquids, if desired.

While in the apparatus shown, the milk passes immediately from the high temperature in the super-heating step to the cooling medium, I may use an apparatus wherein the milk is held at this high temperature for a short period of time, as from one to fifteen minutes, and then cooled.

Having thus described my invention, I claim:

1. The process of pasteurizing milk or other fluids which consists in heating the milk to a pasteurizing temperature and holding the milk at such temperature to effect the proper or perfect pasteurization of the milk, subsequently heating the milk to a higher temperature with no substantial reduction of temperature between the holding temperature and the subsequent higher temperature, and finally cooling the same.

2. The process of pasteurizing milk or other fluids which consists in initially heating the milk to a temperature ranging from one hundred and forty to one hundred and fifty degrees F. holding the milk at this temperature for a relatively long period of time to effect the proper or perfect pasteurization of the milk, subsequently heating the milk to a higher temperature for a relatively short period of time and finally rapidly cooling the same.

3. The process of pasteurizing milk or other fluids which consists in passing the milk through heating devices wherein said milk is brought to a temperature ranging from one hundred and forty degrees to one hundred and fifty degrees F., subsequently passing the milk through containers constructed to maintain said temperature for a relatively long period of time, then passing the milk through a superheater whereby the temperature is raised for a relatively short period of time and finally rapidly cooling the milk.

4. The process of pasteurizing milk or other fluids which consists in heating the milk to a pasteurizing temperature and holding the milk at such temperature to effect the proper or perfect pasteurization of the milk, subsequently subjecting the milk to the action of a heating medium of higher temperature for a short period of time and cooling the same.

In testimony whereof, I have hereunto signed my name, at Philadelphia, Pennsylvania, this fifteenth day of December, 1913.

SAMUEL M. HEULINGS.

Witnesses:
JAMES H. BELL,
E. L. FULLERTON.